United States Patent
Galmiche et al.

(10) Patent No.: US 12,084,114 B2
(45) Date of Patent: Sep. 10, 2024

(54) MOTOR VEHICLE EQUIPPED WITH AN IMPACT DEVICE BETWEEN THE DRIVE SYSTEM AND THE FRONT CRADLE

(71) Applicant: PSA AUTOMOBILES SA, Poissy (FR)

(72) Inventors: Jean Pierre Galmiche, Dampierre les Bois (FR); Jean Louis Medecin, Vyans le Val (FR); Olivier Le Guillou, Montbeliard (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/555,032

(22) PCT Filed: Feb. 22, 2022

(86) PCT No.: PCT/FR2022/050316
§ 371 (c)(1),
(2) Date: Oct. 12, 2023

(87) PCT Pub. No.: WO2022/223894
PCT Pub. Date: Oct. 27, 2022

(65) Prior Publication Data
US 2024/0083509 A1 Mar. 14, 2024

(30) Foreign Application Priority Data
Apr. 22, 2021 (FR) ...................................... 2104194

(51) Int. Cl.
*B62D 21/15* (2006.01)
*B60G 21/00* (2006.01)
(Continued)

(52) U.S. Cl.
CPC ......... *B62D 21/152* (2013.01); *B60G 21/005* (2013.01); *B60K 5/12* (2013.01);
(Continued)

(58) Field of Classification Search
CPC ...... B60R 2019/005; B60R 2021/0266; B60R 19/00; B60R 2021/0004; B62D 21/152;
(Continued)

(56) References Cited

U.S. PATENT DOCUMENTS 5,251,932 A * 10/1993 Ide ...................... B62D 21/155
296/204
5,547,224 A * 8/1996 Kami ..................... B62D 21/11
280/834
(Continued)

FOREIGN PATENT DOCUMENTS

FR 2676407 A1 * 11/1992 ............. B60R 19/00
FR 2982829 A1 5/2013
(Continued)

OTHER PUBLICATIONS

International Search Report for corresponding PCT/FR2022/050316 mailed on Jun. 15, 2022.
(Continued)

Primary Examiner — Timothy Wilhelm
(74) Attorney, Agent, or Firm — Sandberg Phoenix & von Gontard P.C.

(57) ABSTRACT

Motor vehicle comprising a drive system arranged in a compartment at the front of a vehicle, a cradle (2) comprising a platform (4) fastened in this compartment in the region of a floor of the vehicle, an anti-roll bar (10) fastened in the vertical direction above the platform (4), and an impact device (30) fastened to a front edge (20) of the platform (4), behind an impact block fastened to a powertrain of this vehicle, in order, in the event of a recoil of this powertrain, to allow the impact block to bear on the impact device (30), which deforms, the impact device (30) comprising an upper part projecting above the platform (4), which, in the event of a large deformation, bears on the anti-roll bar (10).

9 Claims, 2 Drawing Sheets

(51) Int. Cl.
  *B60K 5/12* (2006.01)
  *B60R 21/00* (2006.01)
  *B62D 21/11* (2006.01)

(52) U.S. Cl.
  CPC ............ *B60K 5/1275* (2013.01); *B62D 21/11* (2013.01); *B62D 21/155* (2013.01); *B60R 2021/0004* (2013.01)

(58) Field of Classification Search
  CPC ............ B62D 21/155; B60G 2206/016; B60K 5/1275
  See application file for complete search history.

(56) References Cited

U.S. PATENT DOCUMENTS

| | | | | |
|---|---|---|---|---|
| 5,605,353 | A * | 2/1997 | Moss ..................... | B62D 21/09 188/376 |
| 6,276,484 | B1 * | 8/2001 | Evans .................. | B60K 5/1275 180/291 |
| 7,726,672 | B2 * | 6/2010 | Yamagishi ......... | B60G 21/0551 280/124.109 |
| 8,672,393 | B2 * | 3/2014 | Tomozawa ........... | B62D 25/082 296/193.09 |
| 8,894,134 | B2 * | 11/2014 | Tomozawa ............... | B60K 5/00 296/203.02 |
| 9,045,172 | B2 * | 6/2015 | Gopal .................. | B62D 21/155 |
| 9,096,276 | B2 * | 8/2015 | Komiya ................ | B62D 21/11 |
| 9,428,129 | B2 * | 8/2016 | Crona ..................... | B60R 19/34 |
| 10,427,720 | B2 * | 10/2019 | Ikeda ....................... | B60K 5/04 |
| 10,471,994 | B2 * | 11/2019 | Ikeda ................... | B60K 5/1275 |
| 10,625,785 | B2 * | 4/2020 | Komiya ................ | B62D 21/11 |
| 10,654,525 | B2 * | 5/2020 | Komiya ................ | B62D 21/11 |
| 10,676,133 | B2 * | 6/2020 | Komiya ................ | B62D 21/11 |
| 10,717,468 | B2 * | 7/2020 | Hara .................... | B62D 21/152 |
| 10,988,036 | B2 * | 4/2021 | Park ........................ | B60L 50/66 |
| 11,161,402 | B2 * | 11/2021 | McCarron ............ | B62D 21/152 |
| 11,623,692 | B2 * | 4/2023 | Eklund ................. | B62D 21/11 296/184.1 |
| 2021/0024132 | A1 * | 1/2021 | Okamoto ................. | B60K 5/04 |

FOREIGN PATENT DOCUMENTS

FR    3094286 A1 * 10/2020
WO    2021038145 A1    3/2021

OTHER PUBLICATIONS

Written Opinion for corresponding PCT/FR2022/050316 mailed on Jun. 15, 2022.

* cited by examiner

[Fig. 1]
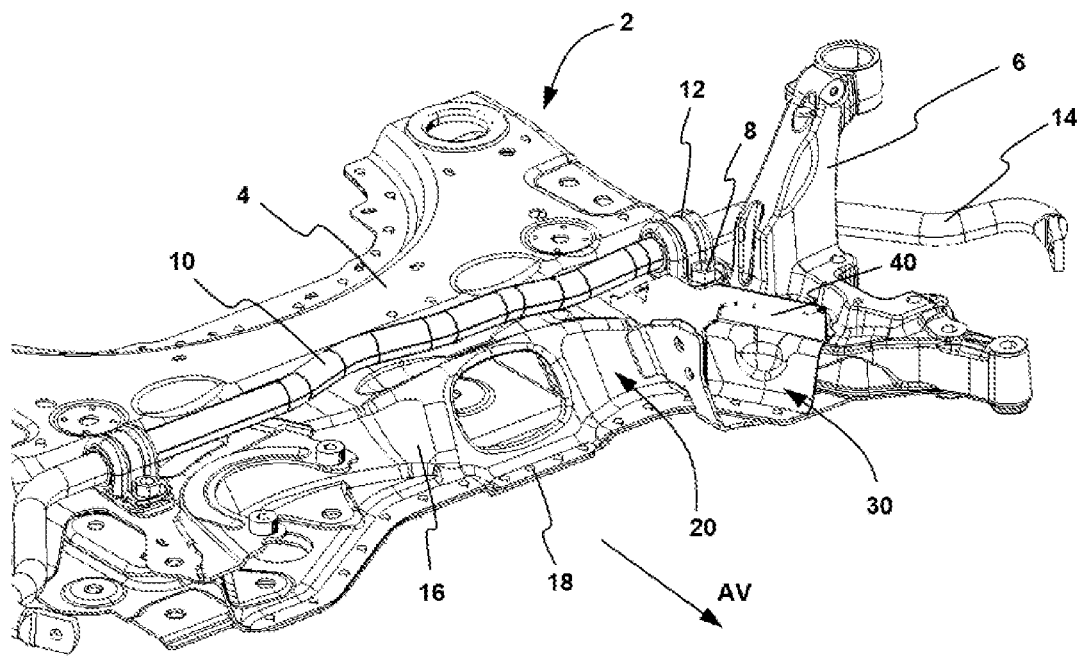
[Fig. 2]
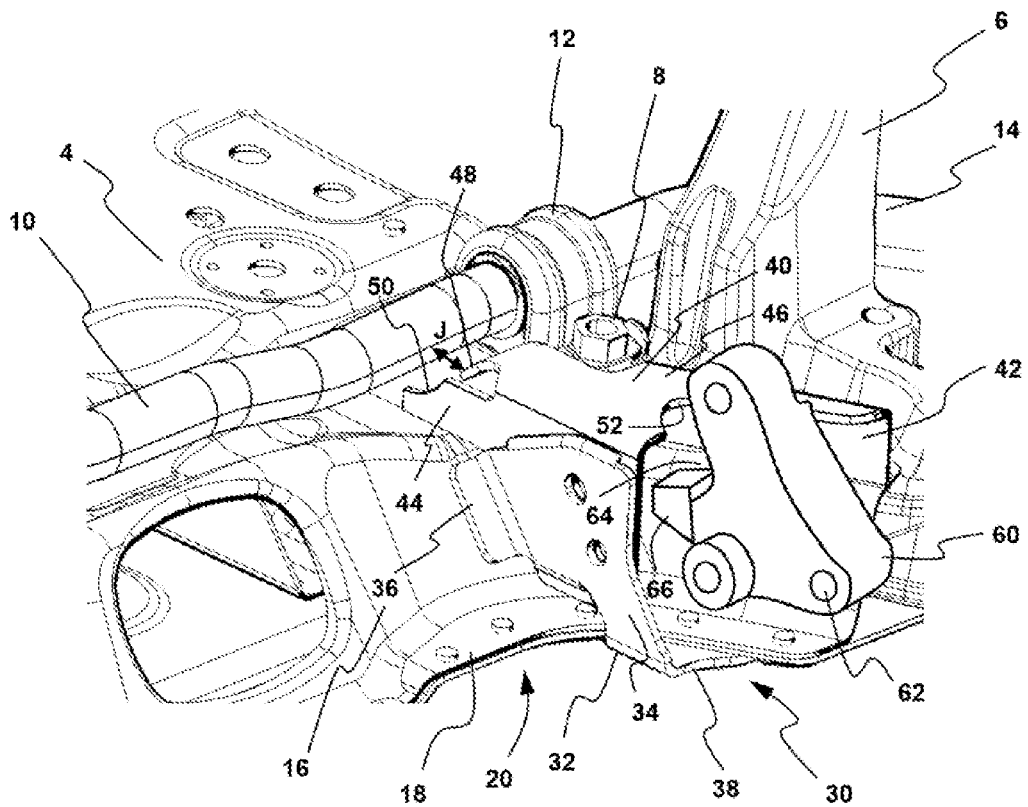

[Fig. 3]
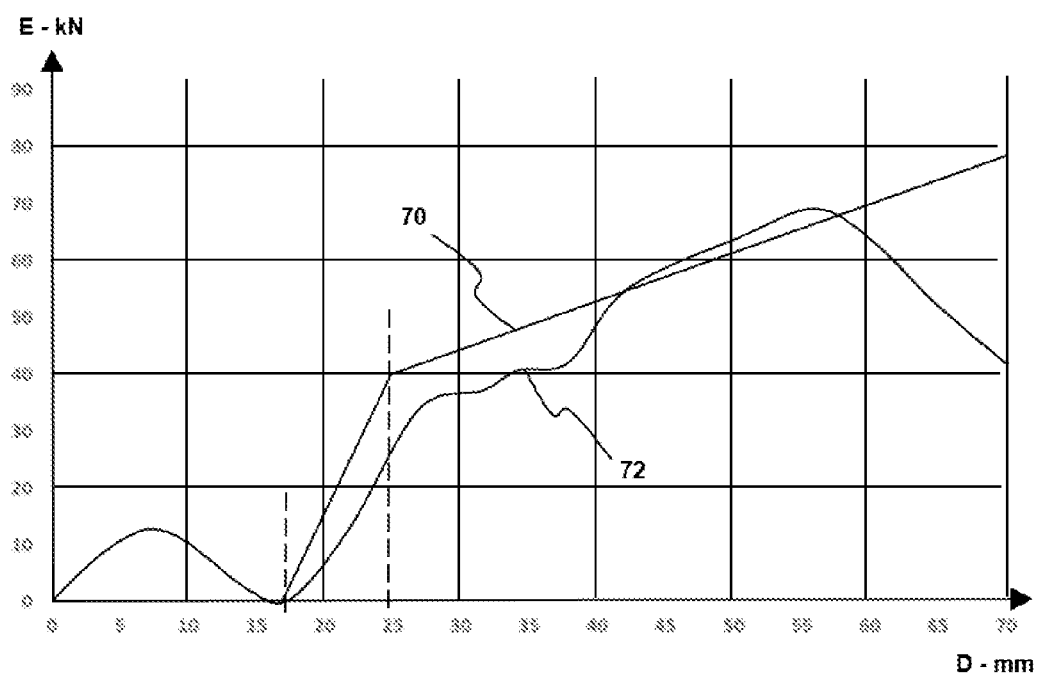

MOTOR VEHICLE EQUIPPED WITH AN IMPACT DEVICE BETWEEN THE DRIVE SYSTEM AND THE FRONT CRADLE

CROSS-REFERENCE TO RELATED APPLICATIONS

This application is the US National Stage under 35 USC § 371 of International Application No. PCT/FR2022/050316, filed Feb. 22, 2022, which claims the priority of French application No. 2104194 filed on Apr. 22, 2021, the content (text, drawings and claims) of both said applications being incorporated by reference herein.

BACKGROUND

The devices described herein relate to a motor vehicle equipped with an impact device between the drive system and the front cradle.

Motor vehicles generally comprise a front cradle comprising a rigid platform fastened to the body of the vehicle in the front compartment, at the floor, which receives, on each side, front wheel suspension triangles and supports of the powertrain.

The powertrain may comprise a heat engine and a gearbox, or an electric traction motor having a reducer. The transmission fastened to one end of the motor comprises two output shafts arranged transversely at the rear of the motor, which each drive a front drive wheel of the vehicle.

Moreover, vehicle approval requires standardized front impact tests in order to protect the passengers during an accident. In particular, the recoil of the mechanical members in the engine compartment under the effect of impact is studied, so as to avoid excessive intrusion of elements into the passenger compartment, pressing in the apron arranged in front of the feet of the driver and the front passenger, which could injure them.

To this end, one known type of impact protection device, presented in particular by document FR-A1-2982829, fastened at the bottom of the heat engine, comprises a lower part arranged in front of a front edge of the platform of the cradle, and an upper part arranged between this motor and a transverse wheel shaft.

In the event of a strong front impact on the vehicle, the lower part of the protection device catches on the front edge of the cradle, and the upper part prevents direct impact of the transmission shaft on the casing of the motor, which could lead to significant damage.

However, during a front impact, the recoil resistance of the drive system, which passes through an impact device bearing only on the front edge of the cradle of the vehicle, is limited by the hold of this device on the front edge. Significant deformation of the metal is possible with insufficient resistance, which, based on the impact force, leaves an excessive recoil of the drive system, with risks of injury for the vehicle passengers.

SUMMARY

The purpose of the devices described herein is in particular to avoid these problems of the prior art.

To this end, it proposes a motor vehicle comprising a drive system arranged in a compartment at the front of a vehicle according to its direction of travel, a cradle comprising a platform fastened in this compartment, an anti-roll bar fastened in the vertical direction above the platform, and an impact device fastened to a front edge of the platform, behind an impact block fastened to a powertrain of this vehicle, in order, in the event of a recoil of this powertrain, to allow the impact block to bear on the impact device, which deforms, this vehicle being remarkable in that the impact device comprises an upper part projecting above the platform, which, in the event of a large deformation, bears on the anti-roll bar.

One advantage of this vehicle is that, in a simple and economical manner, by extending the upper part of the impact device above the platform, toward the anti-roll bar, a very resistant additional pressure point of this device is obtained, formed by this anti-roll bar, which causes an additional deformation of the device providing additional stiffness during the recoil of the motor.

Thus, a complementary resistance point is added to the catch on the front edge of the platform, which makes it possible, with no additional part, to obtain a total retention force of the drive system based on its movement making it possible to pass very restrictive resistance standards.

The motor vehicle may further comprise one or more of the following features, which can be combined with one another.

Advantageously, the impact device is formed by sheets welded to the front edge of the platform.

In particular, the impact device may comprise an upper sheet and a lower sheet.

Advantageously, the impact device forms a chamber made up of sheets having, along the transverse direction of the vehicle, a closed contour which is open in the forward direction.

Advantageously, the impact device comprises a sheet forming a top face of this device which has, on its rear edge, a downwardly inclined tab arranged in front of a transverse part of the anti-roll bar.

Advantageously, the impact device comprises a sheet forming a vertical side face, having a rear contour comprising a rounded recess arranged in front of a transverse part of the anti-roll bar.

Advantageously, the impact device comprises a sheet forming a top face of this device which has, on its front edge, a notch facing toward the impact block.

Advantageously, the impact block comprises, on its rear face, a recess for catching on the impact device.

In this case, advantageously, the catching recess is arranged opposite the notch of the impact device.

Advantageously, the vehicle comprises a clearance between the upper part of the impact device projecting above the platform and the anti-roll bar, which is less than 20 mm.

BRIEF DESCRIPTION OF THE FIGURES

The described devices will be better understood and other features and advantages will become more clearly apparent on reading the following description given by way of example, with reference to the appended drawings wherein:

FIG. 1 is an overall view of a cradle of a motor vehicle.
FIG. 2 is a detail view of the impact device of this cradle.
FIG. 3 is a diagram showing, during an accident, the retaining force of the recoil of the powertrain based on its movement.

DETAILED DESCRIPTION

Throughout the document, the upper and lower sides and the expressions above or below are relative to a vertical axis connected to a vehicle placed on a horizontal surface, the front direction AV relates to the direction of travel of this vehicle, the right and left sides are defined looking toward the front of the vehicle.

FIGS. 1 and 2 show a front cradle 2 of a motor vehicle, comprising a platform 4 fastened in the engine compartment at the floor of the vehicle, receiving, on each side toward the front, a riser 6 for attaching a suspension.

The platform 4 of the cradle 2 comprises two substantially parallel and horizontal sheets, connected together on their contours to form a rigid chamber. A top sheet has a front face 16 inclined downward, terminating in a horizontal lower rim 18 forming a plane welded to the front side of a substantially flat bottom sheet to form the front edge 20 of the cradle platform 4 having great rigidity.

An anti-roll bar connecting the suspensions of the two front wheels of the vehicle comprises a part arranged in the transverse direction of the vehicle 10, which is held at its ends by bearings 12 fastened to the top of the platform 4 by screws 8, just next to the risers 6. The transverse part 10 extends on each side after the bearing 12 by a part curved toward the front 14 whose end is connected to the suspension. The bearings 12 provide a very rigid connection of the anti-roll bar on the platform 4 of the cradle 2, in order to guide this bar during significant forces which can be applied to the ends of the bar, with the strong tilting of the body of the vehicle.

An impact device 30 forms a small chamber made up of folded sheets having a closed contour in the transverse direction, open toward the front and highly rigid, which is welded to the front platform edge 20, just next to the left bearing of the anti-roll bar 12 and the left riser 6.

The impact device 30 comprises a lower sheet 32 having, to the right, a vertical face 34 terminating toward the rear by a folded tab 36 welded to the inclined front face 16 of the front platform edge 20, and a lower face 38 welded to the bottom sheet of the platform 4.

The impact device 30 comprises an upper sheet 40 having a horizontal top face 46 extending to the left by a vertical face 42 whose base is welded to the platform 4 top sheet, and to the right by a vertical face 44 welded to the right vertical face 34 of the lower sheet.

The top face 46 of the upper sheet 40 has, on its front edge, a hollow cut forming a notch 52 which extends toward the rear, and on its rear edge, a downwardly inclined tab 48, which is arranged slightly in front of the transverse part of the anti-roll bar 10. The right vertical face 44 of the upper sheet 40 has a rear contour forming a rounded recess 50 which is arranged slightly in front of the transverse part of the anti-roll bar 10.

Advantageously, the inclined tab 48 of the rear edge of the upper sheet 40 and the rounded recess 50 of the right vertical face 44 are arranged with a clearance J of less than 20 mm in front of the transverse part of the anti-roll bar 10.

An impact block 60 forms a solid and rigid metal element having holes 62 arranged in the transverse direction of the vehicle, which allow solid attachment to the powertrain, just in front of the impact device 30.

The impact block 60 comprises, on its rear face, a recess 64 arranged in front of the top face 46 of the upper sheet 40, facing the notch 52 of its front edge, which continues downward by a boss facing the rear 66, opposite the front opening of the chamber formed by the impact device 30, to return therein during deformations by providing a catch.

FIG. 3 shows, during a significant front impact on the vehicle causing a recoil of the powertrain, curves describing the retaining force E indicated on the vertical axis in kilo-Newton kN, as a function of the movement D of this powertrain indicated on the horizontal axis in millimeters mm. The curve 70 shows a stiffness required in specifications, and the curve 72 shows a result measured during a digital simulation carried out for a vehicle.

The starting point D0 at 0 mm on the movement axis D corresponds to the initial position of the powertrain. The small movement of the measured force curve 72 to the bearing point at D1 at 17 mm, with a low amount of force rising and then descending again to zero, corresponds to the bearing of the impact block 60 on the impact device 30, after a movement of this powertrain that cancels out the necessary clearance around it to allow the displacement of its vibration filtering resilient supports.

From the bearing point D1, the specifications curve 70 comprises a fast linear increase of the force up to the point D2 at 28 mm, to reach 30 kN, then a lower slope which, at the end, yields a force of 65 kN for a total movement of 70 mm.

The measured force curve 72 has, for a movement up to 40 mm, a value close to the demand for the specifications curve 70, then beyond this, a force value that exceeds this demand. In this curve part, there is first a deformation of the impact device 30 with its sheet parts, which compact toward the rear, then after sufficient movement, give rise to cancellation of the clearance J, additional resistance coming from the bearing of the rear edge of the upper sheet 40 on the transverse part of the anti-roll bar 10.

An effective system for retaining the powertrain is obtained, which, while keeping the same impact system principle, can also be improved by adjusting the clearances to completely satisfy the demand of the specifications.

By using a type of impact device 30 comprising the two folded and welded sheets, and by adding rear shapes to the upper sheet 40 for a similar cost, after a first movement, a bearing on the anti-roll bar forming a point of high resistance, other energy-absorbing deformations are generated. A higher force curve 72 is obtained which makes it possible to avoid intrusions of components into the passenger compartment of the vehicle after a front impact. The compliance with front impact standards can be achieved, and passenger safety is improved.

The invention claimed is:

1. A motor vehicle comprising a drive system arranged in a compartment at the front of a vehicle according to its direction of travel, a cradle comprising a platform fastened in the compartment, an anti-roll bar fastened in the vertical direction above the platform, and an impact device fastened to a front edge of the platform, behind an impact block fastened to a powertrain of the vehicle, in order, in the event of a recoil of the powertrain, to allow the impact block to bear on the impact device, which deforms, wherein the impact device comprises an upper part projecting above the platform, which, in the event of a large deformation, bears on the anti-roll bar, wherein the impact device is formed by sheets welded to the front edge of the platform.

2. The motor vehicle according to claim 1, wherein the impact device comprises an upper sheet and a lower sheet.

3. The motor vehicle according to claim 1, wherein the impact device forms a chamber made up of sheets having, along the transverse direction of the vehicle, a closed contour which is open in the forward direction.

4. The motor vehicle according to claim 1, wherein
the impact device comprises a sheet forming a top face of the device which has, on its rear edge, a downwardly inclined tab arranged in front of a transverse part of the anti-roll bar.

5. The motor vehicle according to claim 1, wherein
the impact device comprises a sheet forming a vertical side face, having a rear contour comprising a rounded recess arranged in front of a transverse part of the anti-roll bar.

6. The motor vehicle according to claim 1, wherein the impact device comprises a sheet forming a top face of the device which has, on its front edge, a notch facing toward the impact block.

7. The motor vehicle according to claim 6, wherein the impact block comprises, on its rear face, a recess for catching on the impact device and wherein the catching recess is arranged opposite the notch of the impact device.

8. The motor vehicle according to claim 1, wherein the impact block comprises, on its rear face, a recess for catching on the impact device.

9. The motor vehicle according to claim 1, wherein the vehicle comprises a clearance between the upper part of the impact device projecting above the platform and the anti-roll bar, which is less than 20 mm.

* * * * *